United States Patent [19]

Hosokawa et al.

[11] Patent Number: 5,741,850
[45] Date of Patent: *Apr. 21, 1998

[54] METHOD FOR THE CONTINUOUS PREPARATION OF ORGANOPOLYSILOXANE EMULSIONS

[75] Inventors: Hidehiko Hosokawa, Crestview Hills, Ky.; Junichi Maeshima; Fumitaka Suto, both of Chiba Prefecture, Japan

[73] Assignee: Dow Corning Toray Silicone Co., Ltd., Tokyo, Japan

[*] Notice: The term of this patent shall not extend beyond the expiration date of Pat. No. 5,563,189.

[21] Appl. No.: 704,478

[22] Filed: Aug. 27, 1996

[30] Foreign Application Priority Data

Aug. 30, 1995 [JP] Japan ................................ 7-245574
Aug. 30, 1995 [JP] Japan ................................ 7-245575

[51] Int. Cl.$^6$ ............................................. C08L 83/00
[52] U.S. Cl. ........................ 524/837; 524/801; 524/588; 524/858
[58] Field of Search ..................... 524/837, 588, 524/858, 801

[56] References Cited

U.S. PATENT DOCUMENTS 5,563,189 10/1996 Hosokawa et al. ............... 523/322

FOREIGN PATENT DOCUMENTS 51565 12/1984 Japan.

*Primary Examiner*—Karen A. Dean
*Attorney, Agent, or Firm*—James L. DeCesare

[57] ABSTRACT

A method capable of the continuous mass-production without pressurization and using a low drive force of highly uniform and very storage-stable organopolysiloxane emulsions. The method for the continuous preparation of organopolysiloxane emulsions includes processes (I) and (II). Process (I) is the continuous supply of (a) organopolysiloxane fluid or gum, (b) emulsifying agent, and (c) water to a mixer having a first-stage shearing and stirring mechanism with a stator and a turbine-type rotor having blades that are slanted obliquely from the radial direction when viewed from the axial direction, and a second-stage shearing and stirring mechanism with a stator and a turbine-type rotor having blades that describe spiral curves with respect to the axial direction, and the discharge of an organopolysiloxane-in-water emulsion with an organopolysiloxane content of 10 to 99 weight %. Process (II) is the introduction of dilution water and the emulsion of process (I) into a mixer as described for process (I). A gas can also be injected in process (I).

12 Claims, 2 Drawing Sheets

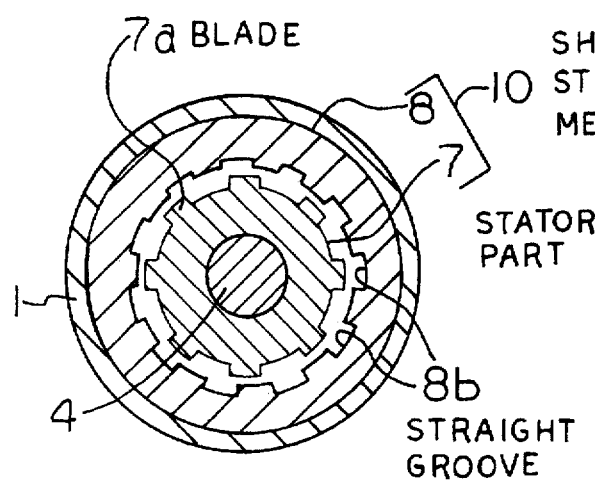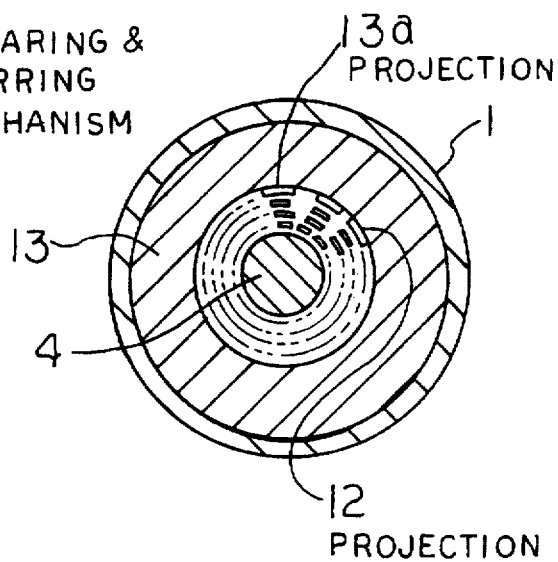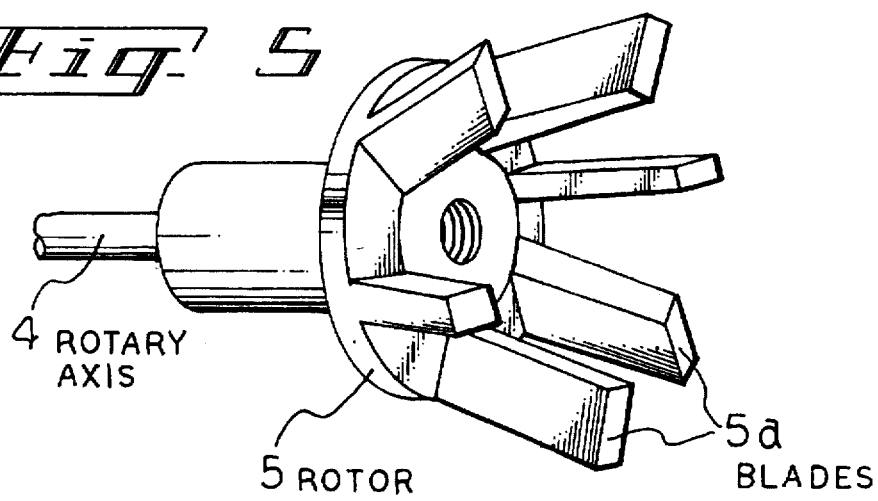

METHOD FOR THE CONTINUOUS PREPARATION OF ORGANOPOLYSILOXANE EMULSIONS

CROSS-REFERENCE TO RELATED APPLICATIONS

This application is related to our prior copending U.S. application Ser. No. 08/498,963, filed Jul. 6, 1995, entitled "Method for the Continuous Preparation of Organopolysiloxane Emulsions", assigned to the same assignee as the present application and now U.S. Pat. No. 5,563,189 granted Oct. 8, 1996.

BACKGROUND OF THE INVENTION

This invention relates to a method for the continuous preparation of organopolysiloxane emulsions. More particularly, this invention relates to a highly productive method for the preparation of very storage-stable and very uniform organopolysiloxane emulsions.

Organopolysiloxane emulsions are widely used in industry as lubricants, release agents, fiber-treatment agents, glass fiber-treatment agents, cosmetic bases, lustrants, and paint additives.

Methods known for the preparation of organopolysiloxane emulsions are exemplified by (a) mixing a starting organopolysiloxane fluid, emulsifying agent, and water using a mixer that applies a stirring action for example, a Henschel mixer or kneader mixer, and (b) mixing said starting materials through the application of a shearing action using a colloid mill, or homomixer. In addition, Japanese Patent Publication Number Sho 59-51565 [51,565/1984] teaches a method that uses a cylindrical container and, installed therein, a stirring element with at least 3 disks installed at a fixed interval on a rotating axle. Diorganopolysiloxane oil, emulsifying agent, and water are continuously fed to the cylindrical container and are sheared and stirred by the stirring element.

However, when the mass production of organopolysiloxane is sought through continuous production, these prior-art methods suffer from the problem of being poorly adaptable to the production of uniform, highly disperse organopolysiloxane emulsions, and each suffer from the problem of poor productivity. In the method disclosed in Japanese Patent Publication Number Sho 59-51565, shearing and stirring must be conducted with the application of pressure in order to make a uniform emulsion, and this automatically incurs such disadvantages as increased operating costs due to the increased drive energy, as well as costs associated with reinforcing the equipment structure. In addition, the material afforded by this method is a grease-like silicone-containing water-based fluid. The use of this grease-like silicone-containing water-based fluid in the applications referenced above requires that it be dissolved in and diluted with water in a batch process using, for example, a shaker.

BRIEF SUMMARY OF THE INVENTION

In order to solve these problems the present inventors have disclosed a method capable of the continuous mass production of a uniform and highly disperse organopolysiloxane emulsion in U.S. Ser. No. 08/498,963, filed on Jul. 6, 1995, now U.S. Pat. No. 5563189 and corresponding to Japanese Patent Application Number Hei 7-9248 [9,248/1995]. This method uses a low drive force and is not carried out under elevated pressure. As a result of additional investigations, the inventors have now discovered a continuous method capable of the direct production of organopolysiloxane emulsions that are already diluted with water to concentrations suitable for the applications referenced above. The present invention was achieved based on this discovery.

In specific terms, the present invention takes as its object the introduction of a highly productive continuous method for the preparation of organopolysiloxane emulsions that, through the use of special shearing and stirring mechanisms, makes possible without pressurization and using a low drive force, the continuous mass production of highly homogeneous and very storage-stable organopolysiloxane emulsions that are already diluted with water to appropriate concentrations.

In another aspect of our invention, a gas can be injected into the starting materials during mixing and emulsification.

These and other objects and features of our invention will become apparent from a consideration of the detailed description.

BRIEF DESCRIPTION OF THE DRAWINGS

FIG. 3 is a cross-sectional view taken along line 3—3 in FIG. 1 when viewed in the direction of the arrows.

FIG. 4 is a cross-sectional view taken along line 4—4 in FIG. 1 when viewed in the direction of the arrows.

FIG. 5 is a perspective view of the rotor of the first-stage shearing and stirring mechanism in the mixer apparatus of FIG. 1.

Figure 1:
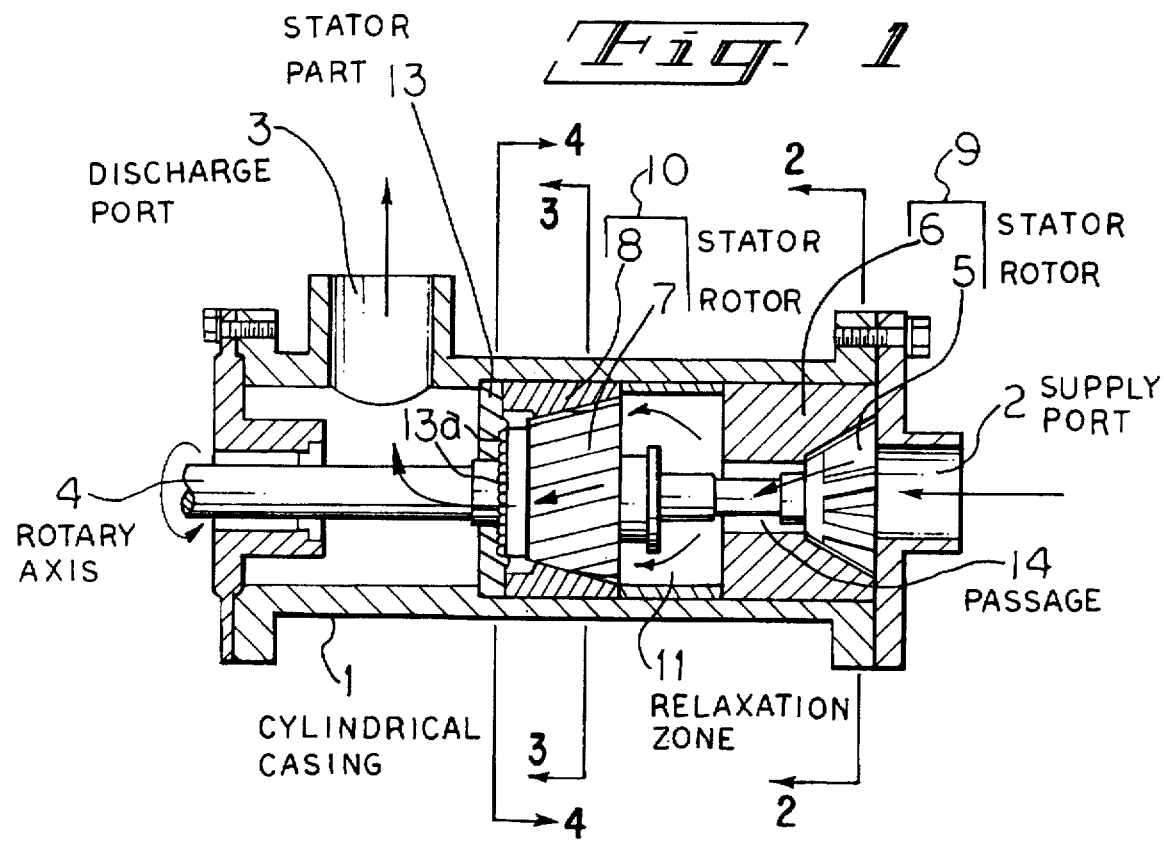
FIG. 1 is a schematic diagram partly in cross-section of a mixer to perform the method of our invention for continuous preparation of organopolysiloxane emulsions.

To facilitate understanding of the invention, and the mixer apparatus in FIGS. 1–5, the names of the various parts have been added to the figures, in addition to their reference numerals. Thus, 1 is the cylindrical casing, 2 is the supply port, 3 is the discharge port, 4 is the rotary axis or axle, 5 and 7 are turbine-type rotors, 5a and 7a are blades, 6 and 8 are stators, 8b is the straight grooves, 9 and 10 are shearing and stirring mechanisms, 11 is the relaxation zone or space, 12 is the sawtooth-like projections, 13 is the stator part or element, 13a is the sawtooth-like projections, and 14 is the flow passage. Supply port 2 can be provided with a separate inlet (not shown) for injecting and feeding a gas into the port 2. Preferably, the gas is introduced separately from the starting materials supplied by port 2.

DETAILED DESCRIPTION

The method according to the present invention for the preparation of organopolysiloxane emulsions achieves these objects and is a method for continuous preparation of organopolysiloxane emulsions by processes (I) and (II) described below.

Process (I) involves the continuous supply of (a) an organopolysiloxane fluid or gum, (b) an emulsifying agent, and (c) water, as starting materials into the supply port of a mixer. The mixer has a cylindrical casing in which there are installed between the supply port and discharge port of the cylindrical casing at least a first-stage shearing and stirring mechanism, and a second-stage shearing and stirring mechanism. The first-stage shearing and stirring mechanism is a turbine-type rotor having blades that are slanted obliquely from the radial direction when viewed from the axial direction, and a stator installed about the circumference of the rotor. The second-stage shearing and stirring mechanism is a turbine-type rotor having blades that describe spiral curves with respect to the axial direction, and a stator installed about the circumference of the rotor.

These mechanisms are arranged serially along the direction of starting material feed and are separated from one another by a relaxation zone. The method involves subjecting starting materials in the first-stage shearing and stirring mechanism principally to an intake action and a shearing action at a shear rate of at least 100/second and then, after passage through the relaxation zone, in the second-stage shearing and stirring mechanism, principally to phase reversal and rotating effects, and a shearing action at a shear rate of at least 100/second; and then discharging from the discharge port, an organopolysiloxane-in-water emulsion with an organopolysiloxane content of 10 to 99 weight %, based on the weight of the emulsion.

The ensuing process (II) is the continuous supply of dilution water and the organopolysiloxane-in-water emulsion made in process (I) into the supply port of the cylindrical casing of a mixer having a cylindrical casing in which there is installed between the supply port and discharge port of the cylindrical casing at least a first-stage shearing and stirring mechanism and a second-stage shearing and stirring mechanism.

The first-stage shearing and stirring mechanism is a turbine-type rotor having blades that are slanted obliquely from the radial direction when viewed from the axial direction, and a stator installed about the circumference of the rotor. The second-stage shearing and stirring mechanism is a turbine-type rotor having blades that describe spiral curves with respect to the axial direction, and a stator installed about the circumference of the rotor.

The mechanisms are arranged serially along the direction of starting material feed and are separated from one another by a relaxation zone. The method involves subjecting the starting materials in the first-stage shearing and stirring mechanism principally to an intake action and a shearing action at a shear rate of at least 100/second and then, after passage through the relaxation zone, in the second-stage shearing and stirring mechanism principally to phase reversal and rotating effects, and a shearing action at a shear rate of at least 100/second; and then discharging from the discharge port of the cylindrical casing a water-diluted organopolysiloxane-in-water emulsion.

In process (I), the starting materials are subjected to an intake action and a shearing action at a shear rate of at least 100/second due to the particular structure of the first-stage shearing and stirring mechanism (hereinafter abbreviated SSM) which is a turbine-type rotor having blades that are slanted obliquely from the radial direction when viewed from the axial direction, and a stator installed about the circumference of the rotor. Due to the particular structure of the second-stage SSM which is a spiral blade-equipped turbine-type rotor and a stator, this stage subjects the mixture to a strong shearing action at a shear rate of at least 100/second between the stator and the spiral blades of the turbine-type rotor. At the same time, the mixture is also impacted against the side surfaces of the spiral blades which are slanted with respect to the rotational axis. This results in strong reversal and rotation effects that forcibly alter the phase into the radial and circumferential directions. Emulsification of the organopolysiloxane proceeds through a synergetic interaction among these actions and effects.

Emulsification is even further advanced by the repetition of the above-described emulsifying effects over at least two stages, with a relaxation zone interposed between successive serially connected SSMs. The overall result is the production of a uniform, highly disperse emulsion of organopolysiloxane.

In the ensuing process (II), dilution water and the highly concentrated organopolysiloxane emulsion made by process (I) are separately and continuously fed to the supply port of a mixer which includes a cylindrical casing in which there is installed between the supply port and discharge port of the cylindrical casing at least a first-stage shearing and stirring mechanism and a second-stage shearing and stirring mechanism. The first-stage shearing and stirring mechanism is a turbine-type rotor having blades that are slanted obliquely from the radial direction when viewed from the axial direction, and a stator installed about the circumference of the rotor. The said second-stage shearing and stirring mechanism is a turbine-type rotor having blades that describe spiral curves with respect to the axial direction, and a stator installed about the circumference of the rotor.

The mechanisms are arranged serially along the direction of starting material feed and are separated from one another by a relaxation zone. The emulsion and dilution water are subjected in the first-stage shearing and stirring mechanism to an intake action and a shearing action at a shear rate of at least 100/second, and are then subjected in the second-stage shearing and stirring mechanism to reversal and rotating effects, and a shearing action at a shear rate of at least 100/second. This directly and continuously affords an emulsion that is uniformly diluted with water to an application-appropriate concentration, and that is free of undissolved high-concentration organopolysiloxane emulsion. The "shear rate" $V_s$ (1/second) referenced herein is the value given by the equation $$V_s \, (1/\text{sec}) = V/C \tag{1}$$

in which V is the peripheral velocity of the turbine-type rotor in cm/second, and C is the gap in centimeters between the inner surface of the stator and the peripheral surface, moving at peripheral velocity V.

The mixer used in process (II) may or may not be identical to the mixer used in process (I).

In FIG. 1, 1 denotes a cylindrical casing whose axial direction is on the horizontal. One end of this casing is equipped with a starting material supply port 2, while the other end is equipped with a discharge port 3 for the emulsified mixture. A rotatable axle 4 is inserted at the center of the cylindrical casing 1 The rotatable axle 4 is inserted from the left end of the cylindrical casing 1 and extends to the vicinity of the supply port 2 on the right end. It is driven by a motor (not shown) that sits outside the casing.

The rotatable axle 4 is equipped with a rotor 5 at its end at the supply port 2 and with a rotor 7 at its middle. Stators 6 and 8, which are fixed in the inner peripheral wall of the cylindrical casing 1, are installed surrounding the circumferences of the rotors 5 and 7, respectively, and in each case are separated therefrom by a small gap. The rotor 5 and the stator 6 make up the first-stage shearing and stirring mechanism 9, while the rotor 7 and the stator 8 make up the second-stage shearing and stirring mechanism 10. In addition, a relaxation space 11 with a relatively large volume is installed between the first-stage SSM 9 and the second-stage SSM 10.

Figure 2:
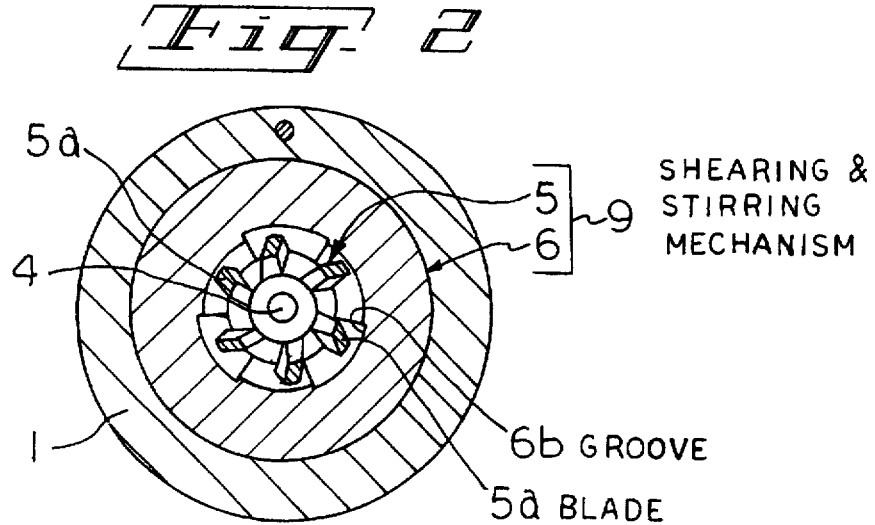
FIG. 2 is a cross-sectional view taken along line 2—2 in FIG. 1 when viewed in the direction of the arrows.

The rotor 5 in the first-stage SSM 9 is a turbine-type rotor, from which a plural number of blades 5a radiate out in a cone-like manner toward the supply port 2 as seen in FIGS. 2 and 5. These blades 5a are substantially parallel to the axial direction in plane view, but are slanted relative to the axial direction in side view, and are obliquely slanted with respect to the radial direction when viewed from the axial direction.

The stator 6 in the SSM 9 forms a near-conical interior peripheral surface that contains grooves 6b that extend in the axial direction. The rotor 5 is inserted into the conical stator 6 with the formation of a narrow gap with the peripheral edges of the blades 5a. The minimum gap size is 2 mm or less, and is preferably about 1 mm, as seen in FIG. 2.

The rotor 7 in the second-stage SSM 10 is also a turbine-type rotor, but unlike the SSM 9, the blades 7a describe a spiral with reference to the axial direction. The blades 7a are also shorter in the radial direction than the blades 5a of the rotor 5 of the SSM 9 as seen in FIG. 3.

The stator 8 of the SSM 10 has a near-conical shape, and its interior peripheral surface contains a number of straight grooves 8b that extend in the axial direction. The rotor 7 is inserted into the stator 8 with the formation of a small gap with the outer surfaces of the spiral blades 7a. This gap is formed so as to become progressively narrower in a wedge-like manner, moving from the upstream side to the downstream side as shown in FIG. 1. The minimum gap size is 2 mm or less and is preferably about 1 mm.

A number of rearward projecting sawtooth-like projections 12 are present on the downstream end surface (i.e., the surface perpendicular to the axial direction) of the rotor 7 of the second-stage SSM 10. These projections 12 alternate moving radially, with a number of sawtooth-like projections 13a fixed on the stator element 13. A narrow gap remains interposed between the projections 12 and the projections 13a. These projections 12 and 13a are formed in a spirally curved pattern radiating outward along the radial direction as shown in FIGS. 1 and 4.

To carry out the method of our invention for the continuous preparation of organopolysiloxane emulsions, the three starting materials, i.e., (a) the organopolysiloxane fluid or gum, (b) the emulsifying agent, and (c) water, are supplied in process (I) to the starting material supply port 2 of the mixing device in which there are serially installed at least the above-described described first-stage shearing and stirring mechanism 9 and the above-described second-stage shearing and stirring mechanism 10. These starting materials may be supplied separately, or they may be supplied in the form of a prepared mixture.

The first-stage SSM 9 performs an intake action and also an initial emulsifying action on the starting materials. The intake action is performed mainly through the outward radiating shape of the blades 5a on the rotor 5 which are obliquely slanted with reference to the radial direction when viewed from the axial direction. The initial emulsifying action occurs through a microparticulation and emulsification of the organopolysiloxane fluid or gum resulting from the shearing or cutting action applied to the three starting materials between the outer peripheral surface of the blades 5a and the inner wall of the stator 6 This shearing action should apply shear at a shear rate of at least 100/second.

After initial emulsification by the first-stage SSM 9, the mixture is squeezed into the intermediate flow passage 14, then fed into the relaxation space 11, where it is released from its compressed state, and thereafter supplied to the second-stage shearing and stirring mechanism 10.

In the second-stage SSM 10, a coarse grinding action is performed by the stator 8 and the spiral blades 7a of the rotor 7, while a fine grinding action is developed by the shearing action generated by intermeshing between the sawtooth-like projections 12 on the downstream end surface of the rotor 7 and the sawtooth-like projections 13a on the stator element 13.

Upon introduction into the space circumscribed by the blades 7a of the rotor 7 and the inner wall of the stator 8, the mixture is subjected to phase reversing and rotating effects due to the action of the blades 7a which are diagonally curved in the axial direction. This functions to alter the phase to the radial and circumferential directions. An even finer and more uniform emulsification is obtained as the mixture, while being subjected to these reversing and rotating effects, is at the same time also subjected to a shearing or cutting action between the peripheral surfaces of the blades 7a and the inner wall of the stator 8 which is equipped with a number of straight grooves 8b. This shearing action should apply shear at a shear rate of at least 100/second.

The resulting emulsified mixture becomes even more finely emulsified in the downstream fine grinding region between the sawtooth-like projections 12 and 13a, yielding a highly disperse and uniform organopolysiloxane emulsion that is discharged from the discharge port 3 in the cylindrical casing 1 as an organopolysiloxane-in-water emulsion, preferably containing 10 to 99 weight %, and more preferably 20 to 99 weight % organopolysiloxane. The discharged organopolysiloxane emulsion will generally contain (a) 10 to 99 weight % organopolysiloxane fluid or gum, (b) 0.1 to 89 weight % emulsifying agent, and (c) 1.0 to 89 weight % water.

In the ensuing process (II), dilution water and the highly concentrated organopolysiloxane emulsion made by process (I) are separately and continuously fed to the starting material supply port 2 of another mixer in which the above-described SSM 9 and SSM 10 are installed in series.

The first-stage SSM 9 performs mainly an intake action on the starting materials, while also effecting an initial mixing and dissolution, by subjecting the inputs to a shearing or cutting action. This shearing action should apply shear at a shear rate of at least 100/second.

After its initial mixing and dissolution by the first-stage SSM 9, the mixture is squeezed into the intermediate flow passage 14, then fed into the relaxation space 11, where it is released from its compressed state, and supplied to the second-stage shearing and stirring mechanism 10.

The second-stage SSM 10 performs both a coarse grinding action and a fine grinding action. Upon introduction into the space circumscribed by the blades 7a of the rotor 7 and the inner wall of the stator 8, the mixture is subjected to phase reversing and rotating effects due to the action of the blades 7a which are diagonally curved in the axial direction. This functions to change the phase to radial and circumferential directions. An even finer and more uniform dissolution is obtained, because the mixture, while being subjected to these reversing and rotating effects, is at the same time also subjected to a shearing or cutting action between the peripheral surfaces of the blades 7a and the inner wall of the stator which is equipped with a number of straight grooves 8b. This shearing action should apply shear at a shear rate of at least 100/second.

The mixture of water and organopolysiloxane emulsion dissolved as described above becomes even more finely dissolved and homogenized in the downstream fine grinding region between the sawtooth-like projections 12 and 13a, yielding a highly disperse and uniform organopolysiloxane emulsion that is diluted with water to a concentration appropriate to a particular application. This product is discharged from the discharge port 3 in the cylindrical casing 1.

The continuous production of organopolysiloxane emulsions by the method of our invention may be performed using separate feeds of starting organopolysiloxane fluid or gum, emulsifying agent, and water to the starting material supply port 2 in process (I), or by preliminarily mixing these starting materials and supplying a mixture to the starting material supply port 2 for process (I). The dilution water used in process (II) is preferably supplied separately from the relatively highly concentrated organopolysiloxane emulsion made in process (I).

It is important to the present invention that there are serially installed at least a first-stage shearing and stirring mechanism having a stator and a turbine-type rotor whose blades are slanted obliquely from the radial direction when viewed from the axial direction, and a second-stage shearing and stirring mechanism having a stator and a turbine-type rotor whose blades describe spiral curves with respect to the axial direction. This two-stage serial combination may be repeatedly serially connected a number of times, in order to obtain an ever finer emulsification; and dissolution, and homogenization, as may be desired.

An extremely fine emulsification, dissolutions and homogenization is achieved by at least the two-stage combination described above. But in addition, a front stage with the first-stage SSM that implements primarily starting material intake and shearing activities, and a rear stage having the second-stage SSM that implements primarily reversing and rotation activities simultaneously with a shearing activity, makes possible emulsification, dissolution, and homogenization of the mixture at low pressures using a low drive power. The process is enhanced by the presence of a sufficiently large relaxation zone between the first-stage and second-stage SSMs.

A shear rate of at least 100/second, but preferably of 10,000 to 300,000/second, should be applied to the mixture between the stator and turbine-type rotor in each shearing and stirring mechanism. When a shear rate below 100/second is applied to the mixture the process cannot yield a highly disperse and uniform emulsion diluted with water to the concentration appropriate to an intended application.

With regard to the shearing and stirring mechanism(s) from the second stage on, it is preferred to make the first shearing action a coarse grinding zone to carry out a coarse emulsification, dissolution, and homogenization, and to make the second shearing action a fine grinding zone, in order to carry out dissolution and homogenization through fine attrition.

In addition to subjecting the mixture to these high shear rates, the continuous method according to our invention also applies a strong reversing activity through the action of the spiral blades on the turbine-type rotor. This reversing action constantly alters the phase of the mixture into the radial and circumferential directions, and the synergy between this action and the aforementioned shearing action makes possible a much more efficient conversion of the mixture into a uniform emulsion.

The organopolysiloxane (a) may be any organopolysiloxane that is a fluid or gum at ambient temperature. Compounds with the following average unit formula are examples of organopolysiloxane (a):

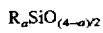

R represents substituted and unsubstituted monovalent hydrocarbon groups, e.g., alkyl groups such as methyl, ethyl, and propyl; aryl groups such as phenyl and tolyl; and such groups in which all or part of the carbon-bonded hydrogen has been substituted by halogen, such as chloromethyl and 3,3,3-trifluoropropyl. The subscript a in the formula has a value of 1.9 to 2.1.

The organopolysiloxane (a) is exemplified by trimethylsiloxy-endblocked dimethylpolysiloxanes, silanol-endblocked dimethylpolysiloxanes, trimethylsiloxy-endblocked dimethylsiloxane-methylphenylsiloxane copolymers, silanol-endblocked dimethylsiloxane-methylphenylsiloxane copolymers, trimethylsiloxy-endblocked dimethylsiloxane-diphenylsiloxane copolymers, silanol-endblocked dimethylsiloxane-diphenylsiloxane copolymers, trimethylsiloxy-endblocked dimethylsiloxane-methyl (3,3,3-trifluoropropyl)siloxane copolymers, and silanol-endblocked dimethylsiloxane-methyl(3,3,3-trifluoropropyl)siloxane copolymers.

The molecular structure of organopolysiloxane (a) can be straight chain, partially branched straight chain, or network. Straight-chain organopolysiloxanes are preferred.

When the organopolysiloxane is a fluid, it preferably has a viscosity at 25° C. of at least 10,000 centistokes. When the organopolysiloxane has a high viscosity, as in the case of a gum, it may be used by dissolving it in a solvent.

The organopolysiloxane may contain additives, such as silica micropowder, on an optional basis, as long as the method is not adversely affected.

Nonionic surfactants, anionic surfactants, and cationic surfactants may be used as emulsifying agent (b). The nonionic surfactants are exemplified by polyoxyalkylene alkyl ethers, polyoxyalkylene alkylphenol ethers, polyoxyalkylene alkyl esters, polyoxyalkylene sorbitan alkyl esters, polypropylene glycol, and diethylene glycol. The anionic surfactants are exemplified by fatty acid salts such as sodium laurate, sodium stearate, sodium oleate, and sodium linolenate; alkylbenzenesulfonic acids such as hexylbenzenesulfonic acid, octylbenzenesulfonic acid, and dodecylbenzenesulfonic acid; salts thereof; and by alkylsulfonates and sodium polyoxyethylene alkylphenyl ether sulfate. The cationic surfactants are exemplified by octyltrimethylammonium hydroxide, dodecyltrimethylammonium hydroxide, alkyltrimethylammonium chlorides, and benzylammonium salts. Two or more types of these surfactants may be used in combination.

This component (b) should be added in sufficient quantity to emulsify the organopolysiloxane fluid or gum (a) in water (c). This component (b) is preferably added in a quantity to provide 0.1 to 89 weight % emulsifying agent (b) in the organopolysiloxane emulsion made by process (I). This component (b) is also preferably added in the range from 1.0 to 100 weight parts per 100 weight parts of the organopolysiloxane fluid or gum (a).

The water (c) may be tap water or ion-exchanged water. The amount of water used in process (I) should provide from 1.0 to 89 weight %, and preferably from 1.0 to 79 weight % water in the emulsion prepared in process (I). The amount of water used in process (I) is also preferably from 1 to 400 weight parts per 100 weight parts of the organopolysiloxane (a). The amount of water used for dilution in process (II) is preferably from 1 to 2,000 weight parts per 100 weight parts of the organopolysiloxane (a).

The organopolysiloxane emulsions made by the continuous method of our invention are emulsions in which the organopolysiloxane fluid or gum (a) is emulsified and dispersed in water, and typically has an average particle diameter in the range from 0.1 to 50 micrometers.

Organopolysiloxane emulsions according to our invention may be directly used for such applications as fiber-treatment agents, lubricants, release agents, glass fiber-treatment agents, oil bases for cosmetics, lustrants, defoamers, and paint additives.

The following examples illustrate our invention in more detail.

EXAMPLE 1

This example employed two of the mixers depicted in FIG. 1 connected in series. There were continuously fed into the starting material supply port 2 of the first mixer, 100 weight parts trimethylsiloxy-endblocked dimethylpolysiloxane with a viscosity at 25° C. of 60,000 centistokes, 9.0 weight parts polyoxyethylene lauryl ether, 3.4 weight parts cetyltrimethylammonium chloride, and 3.6 weight parts ion-exchanged water. These materials were mixed by shearing and stirring to homogeneity, and were discharged as a translucent paste-like emulsion, with a dimethylpolysiloxane content of 86.2 weight %, from the discharge port 3 of the first mixer. 100 weight parts of this paste-like emulsion and 71 weight parts dilution water were then continuously fed to the starting material supply port 2 of the second mixer, where shearing and stirring to homogeneity yielded a dimethylpolysiloxane emulsion with a dimethylpolysiloxane content of 50.4 weight %.

In the first mixer used in this process, the rotation rate of the rotatable axis 4 was 4,200 rpm; the minimum gap was 0.2 mm in both the first-stage shearing and stirring mechanism 9 and the second-stage shearing and stirring mechanism 10; the shear rate in the first-stage shearing and stirring mechanism 9 was 93,000/second; the shear rate in the second-stage shearing and stirring mechanism 10 was 70,000/second; the pressure at the starting material supply port 2 was 0.4 kg/cm$^2$ G; and the pressure at the discharge port 3 was 0.0 kg/cm$^2$ G. In these measurements, G is the guage pressure i.e., atmospheric pressure=0.0 kg/cm$^2$ G.

In the second mixer used in this process, the rotation rate of the rotatable axis 4 was 3,000 rpm; the minimum gap was 0.2 mm in both the first-stage shearing and stirring mechanism 9 and the second-stage shearing and stirring mechanism 10; the shear rate in the first-stage shearing and stirring mechanism 9 was 66,000/second; the shear rate in the second-stage shearing and stirring mechanism 10 was 50,000/second; the pressure at the starting material supply port 2 was 0.0 kg/cm$^2$ G; and the pressure at the discharge port 3 was 0.0 kg/cm$^2$ G.

The resulting dimethylpolysiloxane emulsion by this shearing and stirring process was a milk-white emulsion in which the dimethylpolysiloxane was uniformly emulsified and dispersed in the water. Its average particle size was 0.4 micrometers. This emulsion had a viscosity at 25° C. of 200 centipoise. Even when this emulsion was held for 6 months at ambient temperature, the dimethylpolysiloxane and water did not separate, indicating that this emulsion was extremely stable.

EXAMPLE 2

This example used two of the mixers shown in FIG. 1 connected in series. The following were continuously fed to the starting material supply port of the first mixer: 10 weight parts polyoxyethylene lauryl ether, 5.0 weight parts ion-exchanged water, and 100 weight parts of a mixture with a viscosity at 25° C. of 100,000 centistokes, prepared by the dissolution to homogeneity of 42 weight parts trimethylsiloxyendblocked dimethylpolysiloxane gum with a viscosity at 25° C. of 10,500,000 centistokes, in 58 weight parts isoparaffin with a specific gravity of 0.79 and a viscosity at 40° C. of 2.4 centistokes. These ingredients were mixed by shearing and stirring to homogeneity, and were discharged as a translucent paste-like emulsion with a dimethylpolysiloxane content of 36.5 weight %, from the discharge port 3 of the first mixer. This paste-like emulsion, and 82.4 weight parts dilution water, equivalent to 71 weight parts per 100 weight parts of the paste-like emulsion discharged from the first mixer, were then continuously fed to the starting material supply port 2 of the second mixer, where shearing and stirring to homogeneity, yielded a dimethylpolysiloxane gum emulsion with a dimethylpolysiloxane content of 21.3 weight %.

In the first mixer used in this process, the rotation rate of the rotatable axis 4 was 4,200 rpm; the minimum gap was 0.2 mm in both the first-stage shearing and stirring mechanism 9 and the second-stage shearing and stirring mechanism 10; the shear rate in the first-stage shearing and stirring mechanism 9 was 93,000/second; the shear rate in the second-stage shearing and stirring mechanism 10 was 70,000/second; the pressure at the starting material supply port 2 was 0.4 kg/cm$^2$ G; and the pressure at the discharge port 3 was 0.0 kg/cm$^2$ G.

In the second mixer used in this process, the rotation rate of the rotatable axis 4 was 3,000 rpm; the minimum gap was 0.2 mm in both the first-stage shearing and stirring mechanism 9 and the second-stage shearing and stirring mechanism 10; the shear rate in the first-stage shearing and stirring mechanism 9 was 66,000/second; the shear rate in the second-stage shearing and stirring mechanism 10 was 50,000/second; the pressure at the starting material supply port 2 was 0.0 kg/cm$^2$ G; and the pressure at the discharge port 3 was 0.0 kg/cm$^2$ G.

The dimethylpolysiloxane emulsion made by this shearing and stirring process was a milk-white emulsion in which the dimethylpolysiloxane gum was emulsified and dispersed to homogeneity in the water its average particle size was 0.4 micrometers. Even when this emulsion was held for 6 months at ambient temperature, the dimethylpolysiloxane and water did not separate, indicating that this emulsion was extremely stable.

The above illustrated continuous preparative method according to the present invention is characterized by its ability to continuously mass-produce organopolysiloxane emulsions that are uniform, highly disperse, and very storage stable.

The shearing and stirring processes in the continuous production of organopolysiloxane emulsions according to our invention can be implemented by bubbling in a gas such as air, nitrogen, carbon dioxide, or an inert gas such as argon. This feature of our invention makes possible preparation of even more uniform and more stable organopolysiloxane emulsions, and also makes possible a reduction in pressure within the mixer. Accompanying this is a drop in the driving force required for agitation. The gas is preferably injected at the starting material supply port 2.

The gas used in this aspect of our invention promotes emulsification of the organopolysiloxane emulsion, and yields a homogeneous and very stable emulsion. While the gas is exemplified by air, nitrogen, argon, and carbon dioxide, air and nitrogen are preferred for their safety and ease of acquisition. The organopolysiloxane should be supplied in an amount that affords a value of from 0.01 to 100 (NL/hour)/(kg/hour), and preferably from 0.1 to 10 (NL/hour)/(kg/hour), for a ratio of the amount of the injected gas in NL/hour to the amount of organopolysiloxane fluid or gum being supplied in kg/hour. NL is Normal Liter at 0° C. and one atmosphers. A uniform and highly stable emulsion is difficult to obtain when the ratio is below 0.01 (NL/hour) /(kg/hour). When, on the other hand, the ratio exceeds 100

(NL/hour)/(kg/hour), unemulsified organopolysiloxane may remain in the emulsion, because the inputs will pass through the shearing and stirring mechanism without being subjected to a thorough shearing and stirring.

It is not entirely understood how the gas promotes emulsification and stabilizes the emulsion. Thus, for emulsion preparation in general, admixture of bubbles has been regarded as exercising negative influences on emulsion stability. This occurs because admixed bubbles adsorb emulsion at their interface, thereby consuming same, and because at the same time, they also adsorb emulsified drops and cause them to float upwardly. As a result, avoiding admixture of bubbles has been regarded as essential for emulsion preparation. However, according to our invention, and the continuous emulsion preparation through application of a shearing action, continuously injected gas promotes stirring and mixing of the organopolysiloxane and water inputs during their passage through the zone of the shearing and stirring mechanism, and thereby supports a thorough adsorption of the emulsifying agent to the surface of the organopolysiloxane drops dispersed in the water.

The following additional examples illustrate this aspect of our invention in more detail.

EXAMPLE 3

Using the mixer 1 shown in FIG. 1, 100 weight parts trimethylsiloxy-endblocked dimethylpolysiloxane with a viscosity at 25° C. of 300,000 centipoise, 9.0 weight parts polyoxyethylene lauryl ether, 3.4 weight parts cetyltrimethylammonium chloride, and 3.6 weight parts ion-exchanged water, were continuously supplied through the starting material supply port 2. Compressed air was also continuously injected through a gas supply port connected to port 2, so as to provide a ratio of 1.0 (NL/hour)/(kg/hour) between its feed and the siloxane feed. Shearing and stirring to homogeneity were conducted to yield a dimethylpolysiloxane emulsion.

In regard to the mixer used in this example, the rotation rate of rotatable axle 4 was 4,200 rpm; the minimum gap was 0.2 mm in the shearing and stirring mechanisms 9 and 10; the pressure at the starting material supply port 2 was 0.4 kg/cm² G; and the emulsion discharge pressure at the discharge port 3 was 0.0 kg/cm² G.

The dimethylpolysiloxane emulsion prepared according to the shearing and stirring process in this example was a translucent paste-like emulsion, in which the dimethylpolysiloxane was uniformly dispersed and emulsified in water. The average particle size of the dimethylpolysiloxane in the emulsion was measured at 0.3 micrometers. A second emulsion was also prepared by the addition of 71 weight parts water for each 100 weight parts of this paste-like emulsion. This second emulsion was held at ambient temperature for 6 months without occurrence of separation between the dimethylpolysiloxane and water, which indicated that it was extremely stable.

EXAMPLE 4

This example used two mixers shown in FIG. 1 which were connected in series. The following were continuously fed to the starting material supply port 2 of the first mixer: 10 weight parts polyoxyethylene lauryl ether, 5.0 weight parts ion-exchanged water, and 100 weight parts of a mixture having a viscosity at 25° C. of 100,000 centistokes prepared by dissolution to homogeneity of 42 weight parts trimethylsiloxy-endblocked dimethylpolysiloxane gum with a viscosity at 25° C. of 10,500,000 centistokes in 58 weight parts isoparaffin with a specific gravity of 0.79 and a viscosity at 40° C. of 2.4 centistokes. Compressed air was also continuously injected through a gas supply port connected to material supply port 2 so as to provide a ratio of 1.0 (NL/hour)/(kg/hour) between its feed and the dimethylpolysiloxane feed. These ingredients were mixed by shearing and stirring to homogeneity, and were discharged as a translucent paste-like emulsion with a dimethylpolysiloxane content of 36.5 weight percent, from discharge port 3 of the first mixer. This paste-like emulsion and 82.4 weight parts of dilution water (i.e., equivalent to 71 weight parts per 100 weight parts of paste-like emulsion discharged from the first mixer) were then continuously fed to the starting material supply port of a second mixer, where shearing and stirring to homogeneity yielded a dimethylpolysiloxane gum emulsion with a dimethylpolysiloxane content of 21.3 weight percent.

Conditions in the first and second mixers used in the process carried out in this example were the same as conditions used in Example 1, i.e., the rotation rate of rotatable axle 4, the minimum gap, shear rates, and pressures at supply port 2 and discharge port 3.

The dimethylpolysiloxane emulsion prepared according to this shearing and stirring process was a milk-white emulsion in which the dimethylpolysiloxane gum was emulsified and dispersed to homogeneity in water. Its average particle size was 0.4 micrometers. Even when this dimethylpolysiloxane emulsion was held for 10 months at ambient temperature, the dimethylpolysiloxane and water did not separate, indicating that the emulsion was extremely stable.

Comparative Example

Dimethylpolysiloxane emulsifying agent; and water were mixed as described in Example 3, but in this comparative example without injection of the compressed air used in Example 3. A paste-like emulsion was obtained. The average particle size of dimethylpolysiloxane in this emulsion was measured at 0.4 micrometers. In the case of the second emulsion prepared by the addition of 71 weight parts water for each 100 weight parts of the paste-like emulsion, the dimethylpolysiloxane and water underwent separation after standing for only one day at ambient temperature.

It should be apparent therefore by comparing Example 3 with this Comparative Example, that where emulsification is carried out while continuously injecting a gas into the starting material, that there is produced according to this aspect of our invention, an organopolysiloxane emulsion that is highly homogeneous and very storage stable.

Other variations may be made in compounds, compositions, and methods described without departing from the essential features of our invention. The forms of our invention are exemplary and not limitations on its scope as defined in the claims.

We claim:

1. A method for preparing organopolysiloxane emulsions comprising (A) as a first procedure:

continuously feeding and supplying an organopolysiloxane liquid or gum, water, and an emulsifying agent as materials into the supply port of a first mixer having a cylindrical casing, the cylindrical casing having mounted therein between its supply port and its discharge port a first-stage shearing and stirring mechanism and a second-stage shearing and stirring mechanism, the first-stage shearing and stirring mechanism comprising a turbine rotor having blades slanted obliquely from the radial direction when viewed in the axial direction and a stator about the circumference of the rotor, the second-stage shearing and stirring mechanism comprising a turbine rotor having blades describing spiral curves with respect to the axial direction and a stator about the circumference of its rotor, the first and second stage mechanisms being arranged serially along the direction of flow of fed materials and being separated one from the other by a relaxation zone; subjecting the fed materials in the first-stage shearing and stirring mechanism to an intake and shearing action at a shear rate of at least 100 reciprocal seconds; and after passage through the relaxation zone, subjecting the materials in the second-stage shearing and stirring mechanism to phase reversal rotational effects, and shearing action, at a shear rate of at least 100 reciprocal seconds; and discharging from the discharge port of the cylindrical casing an organopolysiloxane-in-water emulsion having a content of organopolysiloxane in the emulsion of 10–99 weight percent based on the total weight of the emulsion; and (B) as a second procedure:

continuously feeding and supplying dilution water and the organopolysiloxane-in-water emulsion produced in the first mixer by the first procedure to a second mixer, and repeating in the second mixer the steps carried out in the first procedure in the first mixer, and discharging from the discharge port of the cylindrical casing of the second mixer a water-diluted organopolysiloxane-in-water emulsion.

2. A method according to claim 1 in which a rearward surface of the turbine rotor in the second-stage shearing and stirring mechanism has sawtooth-like projections, the second-stage shearing and stirring mechanism including an intervening gap, followed by sawtooth-like projections on a surface of the stator of the second-stage shearing and stirring mechanism, the two sets of sawtooth-like projections on surfaces of the rotor and stator of the second-stage mechanism intermeshing with one another.

3. A method according to claim 1 in which the organopolysiloxane liquid or gum has a viscosity at 25° C. of at least 10.000 centistokes.

4. A method according to claim 1 in which the organopolysiloxane-in-water emulsion produced in the first mixer by the first procedure comprises 10–99 weight percent of the organopolysiloxane fluid or gum, 0.1–89 weight percent of the emulsifying agent, and 1.0–89 weight percent water.

5. A method according to claim 1 in which the amount of dilution water fed and supplied in the second procedure is 1–2,000 weight parts per 100 weight parts of the organopolysiloxane-in-water emulsion produced in the first mixer by the first procedure.

6. A method according to claim 1 in which there is a minimum gap between the turbine rotors and stators of the mechanisms of between about 1–2 mm.

7. A method according to claim 1 in which a gas is injected into the supply port of the first mixer.

8. A method according to claim 7 in which the ratio of the amount of injected gas in NL/hour to the amount of organopolysiloxane liquid or gum supplied in kg/hour is 0.01 to 100 (NL/hour)/(kg/hour).

9. A method according to claim 8 in which the gas is selected from the group consisting of air, nitrogen, carbon dioxide, and argon.

10. A method for preparing organopolysiloxane emulsions comprising continuously feeding and supplying an organopolysiloxane liquid or gum, water, and an emulsifying agent as materials into the supply port of a mixer having a cylindrical casing, continuously injecting a gas into the supply port, the cylindrical casing having mounted therein between its supply port and its discharge port a first-stage shearing and stirring mechanism and a second-stage shearing and stirring mechanism, the first-stage shearing and stirring mechanism comprising a turbine rotor having blades slanted obliquely from the radial direction when viewed in the axial direction and a stator about the circumference of the rotor, the second-stage shearing and stirring mechanism comprising a turbine rotor having blades describing spiral curves with respect to the axial direction and a stator about the circumference of its rotor, the first and second stage mechanisms being arranged serially along the direction of flow of fed materials and being separated one from the other by a relaxation zone; subjecting the fed materials in the first-stage shearing and stirring mechanism to an intake and shearing action at a shear rate of at least 100 reciprocal seconds; and after passage through the relaxation zone, subjecting the materials in the second-stage shearing and stirring mechanism to phase reversal, rotational effects, and shearing action, at a shear rate of at least 100 reciprocal seconds; and discharging from the discharge port of the cylindrical casing an organopolysiloxane-in-water emulsion having a content of organopolysiloxane in the emulsion of 10–99 weight percent based on the total weight of the emulsion.

11. A method according to claim 10 in which the ratio of the amount of injected gas in NL/hour to the amount of organopolysiloxane liquid or gum supplied in kg/hour is 0.01 to 100 (NL/hour)/(kg/hour).

12. A method according to claim 11 in which the gas is selected from the group consisting of air, nitrogen, carbon dioxide, and argon.

* * * * *